United States Patent [19]

Gasparini Noziglia et al.

[11] Patent Number: 5,427,605
[45] Date of Patent: Jun. 27, 1995

[54] METHODS FOR PURIFYING AQUEOUS PHASES IN HYDROMETALLURGICAL EXTRACTIONS

[75] Inventors: Renzo A. Gasparini Noziglia, Chuquicamata; Gustavo H. Bannach Sichtermann, Santiago; Aliro T. N. Pincheira Alvarez, Chuquicamata; Andres A. Reghezza Inzunza, Chuquicamata; Alberto S. Cruz Rivera, Chuquicamata; Gino S. Slanzi Guerra, Chuquicamata; Jorge A. Vergara Chavez, Chuquicamata; Tomas S. Lorca Soto, Antofagasta; Gonzalo R. Cerda Varela, Chuquicamata; Luis F. Hidalgo Cortes, Chuquicamata; Elio F. Moyano Cossio, Chuquicamata; Gabriel E. Vera Baeza, Calama; Samuel F. Castillo Correa, Calama, all of Chile

[73] Assignee: Corporation Nacional del Cobre de Chile, Santiago, Chile

[21] Appl. No.: 112,741

[22] Filed: Aug. 25, 1993

[30] Foreign Application Priority Data

Aug. 27, 1992 [CL] Chile ............................. 921-92

[51] Int. Cl.$^6$ ............................................. C01G 53/10
[52] U.S. Cl. ................................. 75/711; 75/739
[58] Field of Search ................................. 75/739, 711

[56] References Cited

U.S. PATENT DOCUMENTS

| | | | |
|---|---|---|---|
| 2,044,366 | 6/1936 | Pierson | 75/739 |
| 3,293,027 | 12/1966 | Mackiw | 75/739 |
| 3,684,441 | 8/1972 | Faber | 75/739 |
| 4,094,669 | 6/1978 | Balko | 75/739 |
| 4,151,087 | 4/1979 | Sakaguchi | 210/109 |
| 4,199,446 | 4/1980 | Clough | 210/23 R |
| 4,251,369 | 2/1981 | Casad et al. | 210/104 |
| 4,299,699 | 11/1981 | Boogay | 210/143 |
| 4,541,993 | 9/1985 | Norrgran | 75/739 |
| 4,874,534 | 10/1989 | Sorenson et al. | 210/803 |
| 5,174,907 | 12/1992 | Chown et al. | 210/791 |

FOREIGN PATENT DOCUMENTS

2018610 10/1979 United Kingdom .
2052285 1/1981 United Kingdom .

OTHER PUBLICATIONS

Brochure—Jameson Cell: A Compact, Highly Efficient Flotation Machine (4 pps.).
Clayton et al., Applications of the Jameson Cell for Electrolyte Purification in SX-EW Copper Plants.
Report: Solvent Extraction Organic Removal and Recovery from Aqueous Process Streams at Phelps Dodge Morenci Inc.: Engineering Study Addendum.
Puill et al., Coalescence Applied to the Recovery of Solvents from Extraction in Hydrometallurgy.
Brochure—Column Cell Technology—Pub. by Cominco Engineering Services, Ltd. (4 pps.).
Brochure—Deister Flotaire Column Flotation Cells—Pub. by The Deister Concentrator Co.
Baker et al., A Coalescer for Soybean Oil Emulsions, JAOCS, vol. 60, No. 4 (Apr. 1983) p. 851 (1 page).
Thiele, Automatically Controlled Electrolyte Filters in SX Plants: A full-Scale Approach on a Nationwide Level.
SpinTek Brochure (4 pps.).
Paper presented at EXPOMIN '92 setting forth pros and cons of prior art systems.

*Primary Examiner*—Peter D. Rosenberg
*Attorney, Agent, or Firm*—Pennie & Edmonds

[57] ABSTRACT

A method in which a contaminated aqueous solution produced as a result of a hydrometallurgical extraction operation is passed through a filtering bed comprising a plurality of elements, optionally of differing sizes and shapes, formed from materials including plastics and their derivatives, polypropylene, polyester, nylon, teflon, etc., so as to remove organic phase residues, solids, and other contaminants therefrom. The method is complemented by a back wash stage using air and water to dislodge the contaminants from the bed to permit subsequent collection and/or treatment of these materials. The method exhibits technical and economic advantages that are very significant in comparison to traditional methods.

31 Claims, 1 Drawing Sheet

METHODS FOR PURIFYING AQUEOUS PHASES IN HYDROMETALLURGICAL EXTRACTIONS

TECHNICAL FIELD OF THE INVENTION

This invention generally relates to the hydrometallurgical extraction of metals and, in particular, to the separation of organic entrainment, solid particles, and/or other suspended contaminants from an aqueous phase during solvent extraction of metals.

BACKGROUND OF THE INVENTION

In industrial solvent extraction processes, organic entrainment, solids and/or other contaminants must typically be separated from an aqueous phase to permit the subsequent recovery of valuable materials. The efficiency with which these components are removed from the aqueous phase directly affects the quality of the final product, as well as the costs associated with operating the system. For example, in the extraction of uranium from uranium ore by the use of solvents, the presence of contaminants within the system, particularly organic entrainment and solid particles, results in a contaminated final product having a reduced value.

In processes using solvents to extract copper, the presence of organic entrainment in the aqueous phase can cause so-called "burned" cathodes, thereby affecting the marketability of the solution produced by reaction at the cathodes. Moreover, such organic residues, when present in the aqueous phase, also result in increased corrosion of anodes constructed of lead based alloys, which in turn leads to accelerated contamination of the final cathodes with lead. The quality of the cathodes may be so drastically affected by this contamination that they no longer satisfy international norms and requirements for marketing and sale. Furthermore, the presence of such organic entrainment additionally results in greater contamination of the electrolyte vessel because of the high volatility of the organic entrainment at operating temperatures. These residues also increase the risks of fire in the electrolyte cells due to the short circuits typically generated in electrolytic operations.

The presence of solid particles in the aqueous phase can also have a substantial impact on the efficiency of the extraction process and thus these materials directly affect the cost of production. Such solid particles are normally associated with nodulation problems in the cathodes, which must be frequently rejected for this reason. In addition, higher levels of suspended solids involve greater flocculent requirements. Moreover, the solid particles also may form deposits on the surfaces of heat exchangers and thereby significantly diminish heat transfer efficiency. Further, when the solid particles are transferred to an electrolyte having greater acidity, harmful chemicals such as chlorine, manganese, and colloidal silica, may be generated by dissolution therein.

It is also important to emphasize that such solids constitute an additional source of contamination along with organic residues, due to their high absorption capacity. Returning these solids to the solvent extraction process by way of the spent electrolyte can contribute to a greater formation of "crud" in re-extraction stages, and consequently greater wastes and losses of organic reagent having a very high unit cost.

The term "crud" as used herein is commonly understood in the mining industry to refer to a close mixture of organic and aqueous solutions, together with a plurality of extremely fine particles which can be either organic or inorganic in nature. In some cases, the mixture also contains air distributed in a fine dispersion of bubbles. The mixture is present as an emulsified system of small drops of organic material suspended in an aqueous matrix, with the solid particles being distributed at the organic/aqueous interphase. The solids act as a bond to stabilize the mixture.

Finally, in some operations that use techniques of in-situ leaching or leaching in piles, solids and organic residues can clog the solution sprayers, which causes operating problems. In processes where copper sulfate is to be recovered from electrolytes by solvent extraction, the organic entrainment is trapped by the crystals, resulting in contamination which limits the product's marketability. Similar situations can also result in other solvent extraction applications during hydrometallurgical processing of commonly encountered metals.

Another very important aspect affecting operating costs in solvent extraction processes is the loss of organic reagent which becomes trapped within refinery solutions. By way of example, in a plant for the solvent extraction of copper that processes 1,160 $m^3$/hour of feed solutions and a volume of electrolyte of 600 $m^3$/hour, using an organic reagent at 31° /v, losses of only 10 ppm of organic phase in these solutions can involve costs close to $600,000 per year. If losses of the organic phase increased to 40 ppm, the costs associated with such losses would increase to approximately 2.64 million dollars per year.

Hydrometallurgists have therefore long been attempting to develop methodologies for removing these organic entrainment, solid particles and other suspended contaminants from aqueous extraction phases. Techniques typically used in the prior art for this purpose include passing the electrolyte through one or more of the following: sand and anthracite pressure filters, columns containing activated carbon, centrifuges, and after-settlers. Another conventional approach for removing organic entrainment and solid residues from such aqueous solutions includes the use of a scavenger circuit at the electrowinning plant. These alternatives have certain drawbacks, however, since they generally require high investment and operating costs. In some specific cases, they also suffer from low efficiency, and for this reason they are used only to complement the final filtration process.

The use of sand and anthracite pressure filters, such as the well known Degremont filters, has been found to be a good alternative in some respects. However, a substantial drawback to the use of such filters is that they require a significant capital investment. By way of example, using these filters for the filtration of 100 $m^3$/hour of electrolyte requires an investment approaching $300,000. A sophisticated system of instruments and controls is also required for the use of such filters, thereby further increasing both the capital and operating costs. Another disadvantage associated with these filters is that, as a result of abrasion, the sand and anthracite therein have to be periodically replaced due to the loss of fine material from the filter, particularly due to back wash operations. Still another disadvantage is that, due to the high degree of sophistication of the associated equipment, costs for maintenance and spare parts are very significant. Further, the efficiency with which organic entrainment are removed by these filters is riot stable over time. Instead, this efficiency diminishes gradually, becoming critical when the levels of the residues in the feed line increase abruptly as a result of some operating problem. Yet another disadvantage is that the fine material clogs the small openings in the filter, thus affecting its operation.

Still other disadvantages are associated with the use of such anthracite and sand filters as discussed above. These filters must, for example, be subjected to a back wash step, normally after about every 16 hours of use, consequently consuming large quantities of air and water and leading to a significant amount of "down time" for the filters. Also, when these filters are partially emptied, part of the purified electrolyte containing the valuable chemical is lost. Further, because of the geometry of the filters, at the end of the backwash a significant quantity of organic phase always remains in the upper part of the filter. Finally, maintenance times for these filters are excessively long as a result of having to remove and then replace a solid filtering bed having a high specific weight.

The use of activated carbon columns is a further alternative. However, this technique has several serious limitations as set forth below:

1. The necessary equipment requires a substantial investment;
2. Activated carbon has a very high added value. Moreover, loss of carbon during this procedure has a major impact on the operating costs due to the high cost of replacing the carbon;
3. Activated carbon becomes saturated with organic, making it necessary to reactivate the carbon with a pyrometallurgical treatment at high temperatures or by using sophisticated chemical processes;
4. The process requires complicated instruments and controls.

A further alternative is the use of after-settlers which, due to their low efficiency, i.e., typically less than 40%, are considered only as a complement to the use of other filtration units. Further, depending on the size of the plant, a significant investment is required both due to the size of the equipment and because of the special materials required for its construction. A 750 m$^2$ after-settler, for example, requires an investment of about $600,000. Further, the scum floating in these after-settlers has to be removed periodically, which substantially complicates matters when the equipment is large in size.

Flotation techniques, whether carried out in the conventional manner, in columns, or other special designs, are additional alternatives used in the industry. However, these techniques have the following limitations which has caused them to be typically used only as supplementary equipment to the commonly used filters:

1. The technique exhibits low efficiency in removing organic materials, in particular for small concentrations of organic in the feed solution;
2. It does not efficiently remove solids contained in the feed solution;
3. In some specific cases, flotation reagents are used which can subsequently engage in undesirable reactions with the organic phase.

Scavenger circuits are normally incorporated in electrowinning plants that utilize solvent extraction to eliminate the organic entrainment. The organic entrainment is eliminated by the use of the well known microflotation technique, which is performed on site with the use of micro-bubbles resulting from the electrochemical reactions. The scavenger circuit thus acts in a manner similar to sacrifice cells to retain the organic entrainment and to ensure the physical and chemical quality of the cathodes of the commercial circuits.

Finally, although filtration and centrifuging techniques are technically feasible alternatives, there are no known commercial applications of these techniques. It is believed that the use of these techniques is limited due to the substantial investment required for constructing and operating systems requiring their use.

SUMMARY OF THE INVENTION

Accordingly, it is an object of the present invention to provide a process which overcomes the drawbacks of the prior art techniques discussed above, for removing organic entrainment, solid particles and/or other suspended contaminants from aqueous extraction phases produced during the hydrometallurgical extraction of metals. Solutions containing one or more of these suspended materials (i.e., organic entrainment, etc.) are hereinafter generically referred to for convenience as "contaminated" solutions. The process described herein may be implemented with or without a separate treatment step for restoring the physical and chemical properties of the recovered organic entrainment, for example, by treatment with Kieselguhr, or activated clays.

The organic entrainment thus separated may be recovered with the use of a back wash as described below. The back wash solution, when decanted into a suitable pond, for example, a process drainage pond, permits recovery of the organic from the decanted crud. The make-up of this "crud" is well understood by those working in this field as explained above. In another aspect of the invention, removal of the organic entrainment from a refinery solution enables the solution to be used in other hydrometallurgical leaching operations that use equipment having a pitch coating which is incompatible with the presence of organic contaminants.

In the process of the present invention, a contaminated aqueous phase, containing organic entrainment, solids in suspension and/or other suspended contaminants is passed through a porous filtration bed. The filtration bed is comprised of a plurality of elements having the same or different shapes, formed from one or more organic materials compatible with the electrolyte and/or organic phase(s) utilized in the process. Furthermore, these elements may have similar or different geometric properties and/or dimensions.

In a continuous operation, increasing amounts of organic entrainment, solid particles and/or other suspended contaminants are retained in the filtering bed such that the bed becomes gradually saturated with these materials. It therefore becomes necessary to back wash the filter bed from time to time to remove the contaminants therefrom and restore the properties of the filtering bed. To perform this operation, the liquid feed to the bed is cut off, the remaining solution is emptied out by gravity and a back wash is carried out by injecting at least one fluid material such as water, or some other suitable solution, and air, e.g., through the bottom of the reactor, such that the back wash solution passed through the bed in a direction countercurrent to the advance of the liquid feed. Alternatively, however, the contaminated solution may be pumped upwardly from the bottom of the bed, whereupon the back washing operation would proceed from the top of the vessel in a downward direction. The addition of water and air can be done together or separately, continuously or intermittently, through distribution systems that can reach the entire lower surface of the reactor at a suitable pressure and rate of flow.

The process may by carried out in any size or shape vessel that can contain the filtering bed, through which it is possible to run the aqueous solution containing the suspended contaminants. Various configurations of liquid circuits can be utilized. Depending upon the required capacities for removing the suspended contaminants, for example, operations in series, in parallel, or combinations thereof, e.g., series-parallel arrangements can be used. Moreover, the solution containing the suspended contaminants can be fed either through the upper or lower part of the vessel that contains the filtering bed. The solution may be fed by gravity or by pumping it through solution distributing means.

The most relevant advantages of the process of the invention, as compared to known, i.e., prior art, alternatives such as those discussed above, are summarized below:

1. Reduced investment costs—By way of example, the investment required for a Degremont filter for the filtration of 100 m³/hour is close to $300,000. In the present process, to achieve the same objective the required investment is approximately $60,000;
2. The method of the present invention has substantially lower operating costs than those required for the prior art methods described above;
3. The equipment required for the present invention is very simple in contrast to that utilized in the prior art processes, which means that maintenance costs and costs for spare parts are greatly reduced;
4. The materials of which the filtering bed is formed do not readily deteriorate with extended use. For this reason it does not require constant replenishment or refurbishment as in the case of prior art sand and anthracite filters which become worn out due to abrasion and have to be continually replaced;
5. Significant losses from the filtering bed do not occur in the back used in the present invention as typically happens with other prior art techniques;
6. In the present invention, back washing is required only about once a week during continuous operation. In the case of the prior art Degremont filters, backwashing is typically performed for 2 hours after each 16 hours of operation;
7. Longer intervals between back wash operations involve less consumption of air and water, resulting in lower cost and greater availability and utilization of the equipment;
8. Losses of electrolyte-containing valuable chemicals are substantially eliminated in the present process. In the case of the Degremont filters for the filtration of electrolytes of copper, losses typically reach about 2.5 m³ per filter for each stage of back wash;
9. The construction materials used in the present invention are low-cost in comparison to the prior art alternatives;
10. The present invention does not require the use of sophisticated instrument and control systems required in prior art systems;
11. The present method in its simplest form operates by gravity and thus does not require pressurization.

DETAILED DESCRIPTION OF THE INVENTION

Figure 1:
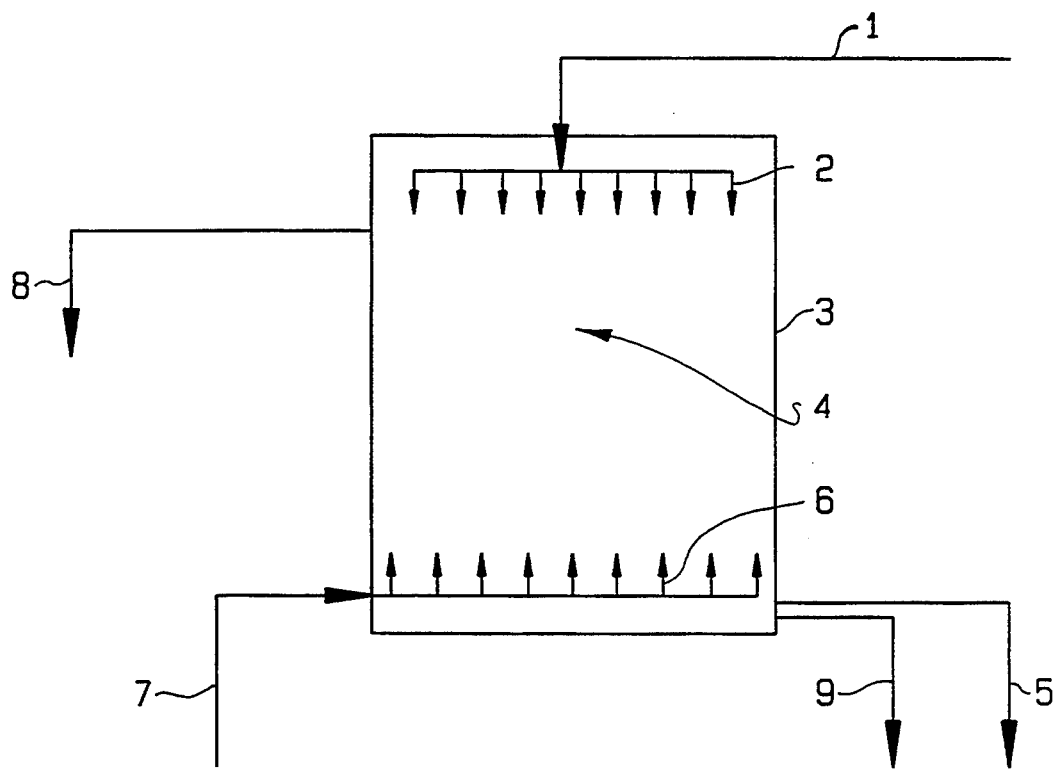
FIG. 1 is a flow chart illustrating a preferred embodiment of the method of the present invention.

FIG. 1. illustrates one preferred flow configuration for a separation process performed in accordance with the method of the present invention. In FIG. 1, a "contaminated" aqueous solution 1 containing organic entrainment, solid particles, and/or other suspended contaminants, is fed by gravity or by pumping through suitable solution distribution means such as distributors 2 to a vessel 3 containing a filtering bed 4. The bed 4 through which the aqueous solution 1 passes may be comprised of elements in the shape of, for example, strings, webs, cloths, fine shavings, spirals, twists, filings, nettings, fine scraps, or spheres.

The elements which comprise bed 4 may be formed be from a variety of materials. Preferred materials include, but are not limited to, plastics, polyvinyl chloride, nylon, polyethylene, polypropylene, polyester, teflon, acrylic, ceramics, and glasses.

If desired for certain applications, bed 4 may additionally include materials such as sand, garnet, anthracite, and/or activated carbon mixed with the filtering elements described above in a mixture ratio in the range of from about 20-50% of the total volume of the bed 4. As those skilled in the art will appreciate, the surface area of the filtering medium is selected in accordance with the desired efficiency of the bed as well as other operating factors, such as flow rate, temperature, etc. Satisfactory results have been obtained with filtering beds having a surface area in the range of 50 to 2000 $m^2/m^3$.

Depending upon such features as the size of the openings in and through the filtering elements, and the apparent densities, permeability and thickness of the webs, their surface area, etc., the flow rate of contaminated aqueous solution 1 through bed 4 can be varied as desired by one skilled in the art without undue experimentation. As would be well understood by those skilled in the art, the apparent density of bed is affected by the type of material used and its real density, the grain size of the material, the porosity and degree of compaction in the bed, and the shape of the material used (i.e., threads, webbings, shavings, etc.). An optimal apparent density for a given specific flow rate exists for each type of material used to form the bed 4 and these values are also readily determinable by one of ordinary skill in the art.

To obtain an efficient system response, the apparent density of bed 4 is complemented by the height of the bed, which preferably varies between 0.2 and 5 m, and more preferably is in the range of 1.5 to 3.0 m. Preferably, the system has an apparent density in the range of 0.02 to 0.20 gr/cc. In this range, specific flow rates will fluctuate between 5 and 15 $m^3/hr \times m^2$. The system is perfectly capable of operating outside of these preferred ranges, however.

The contaminated aqueous solution 1 may be introduced either through the upper or the lower part of the filtering bed 4. Preferably, the solution 1 is pumped and distributed over the filtering bed 4 through distributing means such as distributor 2 comprising perforated high density polyethylene ("HDPE") tubing. The filtering bed 4 possesses surface properties such that it is soaked by the organic entrainment and any solids particles or suspended contaminants present in the aqueous phase. Thus, as the contaminated aqueous solution 1 passes through the filtering bed 4, organic phase residues, solids, and other suspended contaminants are retained therein and a filtered aqueous phase 5, substantially free of contaminants, remains behind. The substantially contaminant-free aqueous phase 5 is then discharged through the lower portion of the unit 3 in the preferred arrangement to permit recovery of the valuable components therein.

The filtering bed 4 is formed of materials which do not absorb the aqueous phase. Thus, the aqueous phase quickly runs off through the bed 4 toward the bottom of the unit 3, under the influence of gravity, after which it is discharged via gravity or pumping. In a preferred embodiment, bed 4 includes a double bottom surface in which the aqueous phase accumulates before it is sent to a subsequent processing stage via gravity.

The system is preferably operated at atmospheric pressure and room temperature, although, as those skilled in the art will recognize, it may be operated at other temperature and pressure levels.

As described above, in continuous operation, increasing amounts of organic residues, solids and other contaminants are retained in the filtering bed 4 such that the bed gradually becomes saturated with these materials (generically defined as "contaminants" herein). It therefore becomes necessary to back wash the bed to remove the contaminants and restore the properties of the filtering bed. In this regard, as soon as a loss in operating efficiency of the filtering bed 4 is detected, typically after several days of continuous operation, feeding of the contaminated aqueous phase is discontinued and the solution remaining in the bed is emptied out by gravity. Once this has been completed, unit 3 is back washed as described below through, for example the lower part of the unit. As noted above, however, in instances wherein the contaminated aqueous stream is pumped up from the bottom of the filtration vessel, the back wash fluids may be introduced at the upper portion of the vessel and allowed to flow downward through the bed either under pressure or by gravity.

During the back wash process, as schematically illustrated in FIG. 1, one or more fluid materials, such as water and air 7 are introduced at high pressure into vessel 3 through suitable distributors 6 for the purpose of removing the impurities that are retained in the filtering bed 4. These impurities are subsequently removed through the upper portion 8 of the unit. In a preferred embodiment, the air is distributed through a system of perforated pipes located throughout the lower portion of the filter. The water may be distributed through a similar system, or preferably fed through the double bottom via a pipe. The air pressure and water flow rate are selected in accordance with the desired operating time and efficiency of the filtering bed 4.

Preferably, the air 7 is introduced at a pressure ranging between about 5 and 30 PSI. The water flow is preferably in the range of about 40 to 120 m$^3$/hr. The suspended contaminants are removed along with the back wash solution, through an upper part of the vessel and are discharged or subjected to subsequent stages for the recovery of the organic phase. After the back wash operation has been completed, the injection of air and water is discontinued and the aqueous phase 9 remaining in column 9 is emptied by gravity through the bottom of the unit and discharged. Once the back wash cycle has been completed, the unit is again ready to begin operation.

In order to enhance the removal of contaminants retained on the bed, the bed may be "expanded" during back washing. That is, the apparent density may be reduced while concurrently expanding the volume of the bed in a manner well known to one of ordinary skill in the art to allow removal of a greater quantity of suspended contaminants.

In yet another embodiment, the filtering bed, along with the impurities retained therein, is entirely removed from the reactor, subjected to washing with water and/or air and/or steam outside the reactor and then subsequently reloaded into the reactor. Once the back wash has been completed, the filter is ready to begin the cycle again.

In a still further embodiment, compact filters can be used, made up of one or more units such as compact packages or rolls having a diameter equivalent to the filter diameter and arranged within the vessel to obtain the desired height. The units may be individually removed from the vessel for washing so that when the back wash has been completed, the filter can be removed and quickly exchanged for another similar filter, thus permitting the operation to continue while simultaneously cleaning removed filters outside the vessel. The filtering medium may also be provided in a vessel or holder that suitably fits within the dimensions of the unit so that the unit may be periodically exchanged according to the back wash cycles chosen for use with the particular filtering medium.

In summary therefore, the methods described herein are very simple to carry out. Various operating configurations can be used including units operating in series, in parallel or in combinations thereof. The liquid feed can be done through the upper or lower part of the unit. Further, as set forth above, the back wash may be performed either within the unit itself, or alternatively, the filtering bed can be removed and washed outside the unit. The filtering bed may also be incorporated in gratings that can be easily removed and replaced. Other variations will be apparent to those skilled in the art.

EXAMPLES

The embodiments described herein and the specific examples of the present invention provided below are presented only for purposes of illustrating the principles of the present invention. Accordingly, the present invention is not to be limited solely to the exact configuration, examples and steps as set forth below.

Example No. 1

The method of the present invention was implemented in an industrial plant operated by the Chuquicamata Division of Codelco-Chile for the extraction of copper by solvents. A pilot column made of stainless steel having an area of 0.44 m$^2$ was utilized to filter an electrolyte solution.

From the pumping system leading to the industrial Degremont filters, a contaminated liquid stream was obtained that was fed through the lower portion of the column through a series of perforated pipes in order to provide a uniform feed. The filtering medium used was a bed 3 meters in height made up of a mixture of teflon and polyester nets.

The contaminated solution was filtered as it gradually rose through the bed. The remaining solution was then discharged through the upper portion of the column and sent by gravity to a collecting pond for advance electrolyte after the electro-extraction process.

At the end of the filtration cycle, once the electrolyte has been completely emptied from the column by gravity, a back wash of the bed was carried out by injecting air and water through the lower end of the column and discharging the solution from its upper end until the bed is sufficiently cleaned to proceed again with the filtration cycle.

A summary of the operating conditions used and the results obtained in this Example are presented below in Table No. 1. The results demonstrate that, under the conditions evaluated it was feasible to remove substantially all the organic entrainment and solids in suspension from the original contaminated solution.

TABLE NO. 1
TEST IN A CYLINDRICAL COLUMN WITH FILTRATION IN ASCENDING FLOW

| ITEM | CYCLE 1 | CYCLE 2 |
|---|---|---|
| Type of filtering bed | mixture of teflon and polyester nets | mixture of teflon and polyester nets |
| Height of filtering bed (m) | 3 | 3 |
| Area of the column with filtering bed (m$^2$) | 0.44 | 0.44 |
| Filtration cycle (hours) | 255 | 235 |
| Back wash cycle (hours) | 26 | 36 |
| Average specific flow (m$^3$/hour × m$^2$) | 7.3 | 9.3 |
| Removal (%) | | |
| Organic entrainment* | 100 | 100 |
| Solids in suspension | 100 | 100 |

*Determined by the standard centrifuge method. This value does not take account of soluble organic in the electrolyte.

Example No. 2

This example also was carried out in an industrial plant for the extraction of copper by solvents by the Chuquicamata division of Codelco-Chile.

A rectangular filter with an area of 2 m$^2$ was fed through its upper portion via gravity with contaminated advance electrolyte originating from the industrial collecting pond for this electrolyte. The feed stream was dispersed over the entire surface of the filter by grooved pipes. As a filtering medium, the same mixture as described above in connection with Example No. 1 was used. The filter included an outlet in the lower portion thereof for discharging the filtered electrolyte, which outlet was protected with a stainless steel web. The outlet was connected to a pump sending the filtered electrolyte to a collecting pond prior to the electrowinning stage. The lower portion of the filter further included a network of perforated stainless steel piping for distributing water and air required for the back wash stage.

The filter was operated continuously by feeding the contaminated solution through its upper portion and discharging the purified solution through its lower portion until the filtration cycle was completed. At the end of the cycle, the remaining solution was completely drained through the same discharge. Thereafter, the filter was back washed by directing air and water streams through the lower portion thereof and discharging the heavily contaminated back wash solution through an outlet in the upper end. The contaminated solution was then sent to a drainage pond for subsequent recovery of the organic entrainment.

A summary of the operating conditions and the results obtained in Example 2 is presented below in Table No. 2. These results demonstrate the feasibility of removing substantially all of the organic phase from the organic entrainment and the solids in suspension from the initial solution with the use of the method of the present invention.

TABLE NO. 2
TEST IN A CYLINDRICAL COLUMN WITH FILTRATION WITH DESCENDING FLOW BY GRAVITY

| ITEM | CYCLE 1 |
|---|---|
| Type of filtering bed | mixture of teflon and polyester nets |
| Height of filtering bed (m) | 1.5 |
| Filtering area (m$^2$) | 2.0 |
| Height of solution over the filtering bed (m) | 0.2 |
| Filtration cycle (hours) | 288 |
| Back wash cycle (hours) | 31 |
| Average specific flow (m$^3$/hour × m$^2$) | 12.55 |
| Removal (%) | |
| Organic entrainment* | 100 |
| Solids in suspension | 100 |

*Determined by the standard centrifuge method. This value does not take account of soluble organic in the electrolyte.

Example No. 3

This example was implemented in a pilot plant for solvent extraction of copper with a capacity of 50 gallons per minute. The plant is normally operated with two electrolyte sand and anthracite filters, one in normal operation and the other as a replacement during periods of maintenance and replacement of sand and anthracite.

In this plant numerous studies were made to evaluate different types of filtering medium, on-site back wash, washing of the filtering medium outside the filter, and other operating conditions.

A summary of the conditions under which the tests were carried out is set forth below:

| | |
|---|---|
| Type of filtering medium | Teflon web, polyester web, propylene webs, shading webs (i.e., nets used in agriculture to protect plants from excess sun and winds. Such shading webs are formed of polypropylene and may have openings of different sizes). |
| Specific flows | 6-9-12 m$^3$/hour × m$^2$ |
| Height of filtering bed | 50-75-100 cm |
| Filtration cycle | 5-10-15 days |
| Height of liquid on filtering bed | 5-10-20 cm. |
| Back wash cycle | 4-6-8 hours |
| Solution feed | through the upper part of the unit with filtration by gravity |

Most of the products used as a filtering bed were commercial products, including shading webs and bags of webs normally used for wrapping fruits, greens and vegetables, and the like.

In all the tests performed, the removal of physically trapped organic entrainment and solid particles was substantially complete, and no rejected cathode was detected on the corresponding electrowinning cells.

Example No. 4

In this example, the process of the present invention was implemented in an industrial solvent extraction plant. The process was carried out on a semi-industrial scale, using a stainless steel rectangular filter with 9 m$^3$ of capacity.

The aqueous phase, containing the organic entrainment and solids in suspension, was fed onto the upper surface of the bed by suitably distributed pipes having perforations on their lower surface adjacent to the filtering bed. The bed was made up of a plurality of polypropylene bags in the form of webs having an apparent density of 0.1 t/m³. To improve the properties of the bed, each small bag was rolled up to increase the specific surface area of the filtering medium per unit of volume.

A stainless steel grating was provided in the lower part of the filter to act as a support for the filtering bed. An additional space for the collection of the filtered solution existed between this grating and the bottom of the unit to enable the filtered solution to be pumped directly from the filter to a collecting pond for filtered advance electrolyte. This double bottom further included an intake for water and perforated pipes suitably distributed for the injection of the air during the back wash operation. A grating for fastening and compacting the bed was provided on the surface thereof so as to prevent the escape of filtering material during the back wash operation. The aqueous phase resulting from the back wash was evacuated via the upper part of the filter through a conduit that collected the solution, which was then sent to a drainage pond for subsequent recovery of the organic entrainment.

The results obtained with the use of this semi-industrial filter are presented below in Table No. 3 wherein they are compared with those obtained with standard "prior art" Degremont industrial filters. These results confirm the high degree of effectiveness of the present invention.

TABLE NO. 3

METALLURGICAL RESULTS WITH A SEMI-INDUSTRIAL FILTER OF THE PRESENT INVENTION AND COMPARISON WITH DEGREMONT FILTERS

| ITEM | DEGREMONT FILTER | SEMI-INDUSTRIAL FILTER |
|---|---|---|
| Days of operation | 6 | 6 |
| Composition of entering solution (ppm) | | |
| Organic phase | 25.2 | 23.6 |
| Solids phase | 4.3 | 4.3 |
| Composition of filtered solution (ppm) | | |
| Organic entrainment | 7.9 | 2.9 |
| Solids in suspension | 0.7 | 0.7 |
| Efficiency of removal (%) | | |
| Organic entrainment | 68.7 | 87.7 |
| Solids in suspension | 83.7 | 83.7 |
| Sequence for the back wash | 2 hours for each 16 hours of operation | 2 hours for each 6 days of operation |

Example No. 5

An industrial filter having a treatment capacity of 100 m³/hours of electrolyte was used in this example.

The filter comprised a stainless steel cylinder having a system in its upper part for the distribution of contaminated solution over the entire area of the filter through perforated polyvinyl chloride pipes. The filter further included a stainless steel bar in the lower portion thereof to act as a support for the filtering bed. Below this lower bar is a double bottom. The filtered solution was moved by gravity from the double bottom to a collecting pond for advance electrolyte prior to the electrowinning process. A system of stainless steel perforated pipes is provided in the double bottom for uniformly distributing air for the back wash. The filter further included a feed line in the double bottom for the water used in the back wash.

The upper portion of the filter included a stainless steel bar that can be bolted at various heights in the reactor to compact the bed. For the back wash stage, this bar is bolted on the upper part of the filter so as to enable expansion of the bed, thus facilitating the back wash operation. Additionally, this bar is webbed to prevent the loss of filtering medium during the back wash. The bar further included a conduit that makes it possible to empty the back wash solution containing the organic entrainment, solids and other suspended contaminants toward a drainage pond from which organic is subsequently recovered.

In the upper portion of the cylinder, at the level of the evacuation conduit for the back wash solution, the filter further includes perforated air injection pipes within the filter wall for conveying organic entrainment and solids toward the drainage conduit. Following the back wash, the solution remaining in the filter is evacuated by the same line as the filtered solution, but is instead directed to a drainage pond with a system of suitable valves.

The filtering bed comprises a plurality of small bags of polypropylene in the form of webs similar to those described in Example No. 4. The upper part of the filter further includes a web on its entire surface to minimize acid haze. The solution being fed to the filter was extracted from a main feeding line to six Degremont filters.

The average operating conditions for the filter used in the Example are set forth below.

| Type of bed | Polypropylene webs |
|---|---|
| Height of bed | 2 m |
| Electrolyte flow | 100 m³/hour |
| Filtration area | 9.08 m² |
| Specific flow | 11 m³/hour × m² |
| Filtration cycle | 7–11 days |
| Back wash cycle | 2–4 hours |
| Level of liquid over the filtering bed | 1 m |
| Air pressure in back wash | 2–8 psi |
| Water flow in back wash | 50 m³/hour for 40 minutes intermittently |

Table No. 4 below summarizes the results obtained in typical runs with the filter described above and compares these results to those obtained in systems incorporating Degremont industrial filters. These results make it possible to establish that the new filter exhibits technical yields that are even greater than those of the Degremont filters.

TABLE NO. 4

METALLURGICAL RESULTS FOR THE INDUSTRIAL FILTER OF THE INVENTION AND COMPARISON WITH DEGREMONT FILTERS

| ITEM | RUN I FILTER DEGREMONT/FILTER OF THE INVENTION | RUN II FILTER DEGREMONT/FILTER OF THE INVENTION | RUN III FILTER DEGREMONT/FILTER OF THE INVENTION |
|---|---|---|---|
| Days of operation | 11/11 | 9/9 | 7/7 |

TABLE NO. 4-continued

METALLURGICAL RESULTS FOR THE INDUSTRIAL FILTER OF THE INVENTION AND COMPARISON WITH DEGREMONT FILTERS

| ITEM | RUN I FILTER DEGREMONT/FILTER OF THE INVENTION | RUN II FILTER DEGREMONT/FILTER OF THE INVENTION | RUN III FILTER DEGREMONT/FILTER OF THE INVENTION |
|---|---|---|---|
| Composition of the entering solution (ppm) | | | |
| Organic Entrainment | 24.5/25.5 | 27.4/26.0 | 39.3/39.7 |
| Solids in suspension | 5.9/5.9 | 2.8/2.9 | 8.6/8.4 |
| Composition of the filtered solution (ppm) | | | |
| Organic Entrainment | 9.8/4.3 | 5.1/3.0 | 2.1/1.8 |
| Solids in suspension | 2.7/2.8 | 0.6/0.3 | 0.6/0.0 |
| Efficiency of removal (%) | | | |
| Organic Entrainment | 60.0/83.1 | 81.4/88.5 | 94.7/95.5 |
| Solids in suspension | 54.2/52.5 | 78.6/89.7 | 93.0/100.0 |

Back wash sequence

Degremont filter    I-2 hours for each 16 hours of operation
II-2 hours for each 16 hours of operation
III-2 hours for each 16 hours of operation Filter of the invention    I-4 hours for each 11 days of operation
II-2 hours for each 9 days of operation
III-2 hours for each 7 days of operation As will be apparent to those skilled in the art, various modifications and adaptations of the embodiments described above will become readily apparent without departure from the spirit and scope of the invention, the scope of which is defined in the appended claims.

We claim:

1. A method for separating contaminants from an aqueous solution comprising:
   introducing a contaminated aqueous solution containing organic entrainment and solid particles in suspension, said solution produced as a result of a solvent extraction process, into a vessel containing a filtering bed comprised of a plurality of elements formed from materials compatible with electrolyte and/or organic phases utilized in the hydrometallurgical extraction process;
   advancing said contaminated aqueous solution through said filtering bed from one end thereof to another, whereupon said contaminants are retained upon said elements, to thereby produce a filtered aqueous solution substantially free of said suspended contaminants; and
   removing said filtered solution from said vessel.

2. The method of claim 1 which further comprises backwashing said filtering bed after removal of said filtered solution to remove substantially all said contaminants retained therein.

3. The method of claim 2 wherein said backwashing steps comprises injecting at least one fluid material into said filtering bed under pressure through at least one means for distributing said fluid within said vessel.

4. The method of claim 2 wherein said backwashing comprises removing said filtering bed from said vessel and washing said bed outside of said vessel to remove said contaminants therefrom.

5. The method of claim 1 wherein said filtration bed has a height in the range of from about 0.2 to 5 m.

6. The method of claim 1 wherein said filtration bed has an apparent density in the range of from about 0.02 to 0.20 gr/cc.

7. The method of claim 1 which further comprises passing said contaminated aqueous solution through said filtration bed at a specific flow rate in the range of about 5 to 15 $m^3/hr \times m^2$.

8. A method for separating contaminants from an aqueous solution produced as a result of a solvent extraction process, said method comprising:
   introducing a contaminated aqueous solution containing organic entrainment and solid particles in suspension, said solution produced as a result of a solvent extraction process, into a vessel containing a filtering bed comprising a plurality of elements formed from materials compatible with electrolyte and/or organic phases utilized in the solvent extraction process;
   advancing said contaminated aqueous solution in a first direction through said filtration bed from one end thereof to another, whereupon said contaminants are retained upon said elements, to thereby produce a filtered aqueous solution substantially free of said suspended contaminants;
   removing said filtered solution from said vessel; and
   thereafter introducing at least one fluid material into said vessel in a second direction counter current to the direction of advance of said contaminated aqueous solution, to remove said contaminants retained by said filtration bed.

9. The method of claim 8 which further comprises forming said plurality of elements from a material selected from the group consisting of plastics, polyvinyl chloride, nylon, polyethylene, polypropylene, polyester, teflon, acrylic, ceramics and glasses.

10. The method of claim 8 which further comprises adding to said filtration bed at least one material selected from the group consisting of sand, garnet, anthracite, and activated carbon.

11. The method of claim 8 which further comprises forming said filtration bed from elements having various geometric properties and dimensions.

12. The method of claim 8 which further comprises introducing said contaminated aqueous solution onto said bed through means for distributing said solution within said vessel at a pressure greater than atmospheric pressure, wherein said aqueous solution has a temperature between room temperature and a boiling point thereof.

13. The method of claim 12 wherein said solution distributing means is a plurality of perforated tubes.

14. The method of claim 12 which further comprises positioning said distributing means in a lower portion of said vessel.

15. The method of claim 12 which further comprises positioning said distribution means in a upper portion of said vessel.

16. The method of claim 8 wherein said fluid material comprises a flow of water and pressurized air.

17. The method of claim 16 which further comprises introducing said pressurized air through a system of perforated pipes positioned at an opposite end of said bed from said solution distributing means.

18. The method of claim 16 which further comprises introducing said air at a pressure in the range of from about 5 to 30 PSI.

19. The method of claim 16 which further comprises introducing said water into said vessel at a flow rate in the range of from about 40 to 120 $m^3$/hr.

20. The method of claim 8 wherein said filtration bed has a height in the range of about 0.2 to 5 meters.

21. The method of claim 8 wherein said filtration bed has a surface area in the range of from about 50 to 2000 $m^2/m^3$.

22. The method of claim 8 wherein said filtration bed has an apparent density in the range of from about 0.02 to 0.20 gr/cc.

23. The method of claim 8 which further comprises forming said filtration bed from rolls of filtering material arranged in a stacked relation within said vessel.

24. The method of claim 8, which further comprises impregnating said filtration bed prior to introducing said contaminated aqueous solution into said vessel.

25. A method for separating contaminants from an aqueous solution produced as a result of a solvent extraction process, said method comprising:

introducing an aqueous solution containing at least one contaminant suspended therein, said at least one contaminant being selected from the group consisting of organic entrainment, solid particles and other suspended contaminants, into a vessel containing a filtering bed comprising a plurality of elements formed from a material which is compatible with electrolyte and/or organic phases utilized in the solvent extraction process, said material being selected from the group consisting of plastics, polyvinyl chloride, nylon, polyethylene, polypropylene, polyester, teflon, acrylic, ceramics and glasses;

advancing said aqueous solution in a first direction through said filtration bed such that said contaminants are retained upon said bed elements, thereby generating a filtered aqueous solution substantially free of said contaminants;

removing said filtered aqueous solution from said vessel; and thereafter injecting a fluid and a gas under pressure through at least one means for distributing said fluid in said vessel in a second direction opposite to said first direction to remove said contaminants retained upon said bed elements.

26. The method of claim 25 which further comprises restoring the physical and chemical properties of said retained organic phase by treating residues of said retained organic phase with a material selected from the group consisting of kieselguhr and activated clays.

27. The method of claim 25 which further comprises introducing said contaminated aqueous solution through a plurality of said vessels arranged in series.

28. The method of claim 25 which further comprises introducing said contaminated aqueous solution through a plurality of said vessels arranged in parallel.

29. The method of claim 25 which further comprises introducing said contaminated aqueous solution through a plurality of said vessels arranged in series-parallel.

30. The method of claim 1 wherein said contaminated aqueous solution is advanced through said filtering bed at atmospheric pressure.

31. The method of claim 8 wherein said contaminated aqueous solution is advanced through said filtering bed at atmospheric pressure.

* * * * *